June 30, 1970
K. SCHNEIDER
3,517,840
CONVEYOR EXCAVATOR HAVING PLURAL CONVEYORS FOR
CONTINUOUS UNLOADING
Filed Jan. 2, 1968
5 Sheets-Sheet 1
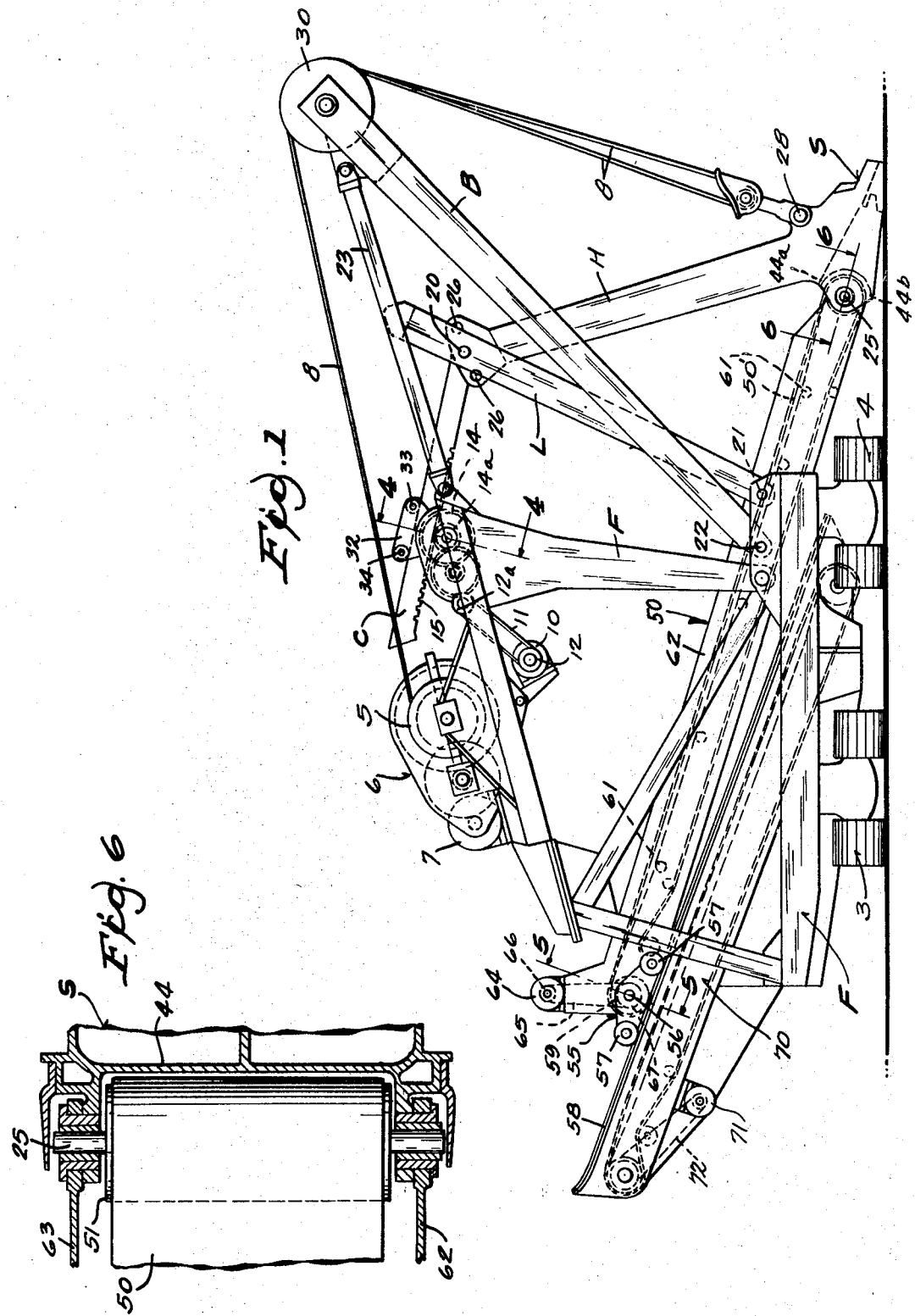
INVENTOR:
KARL SCHNEIDER
BY: James E. Nilles
ATTORNEY

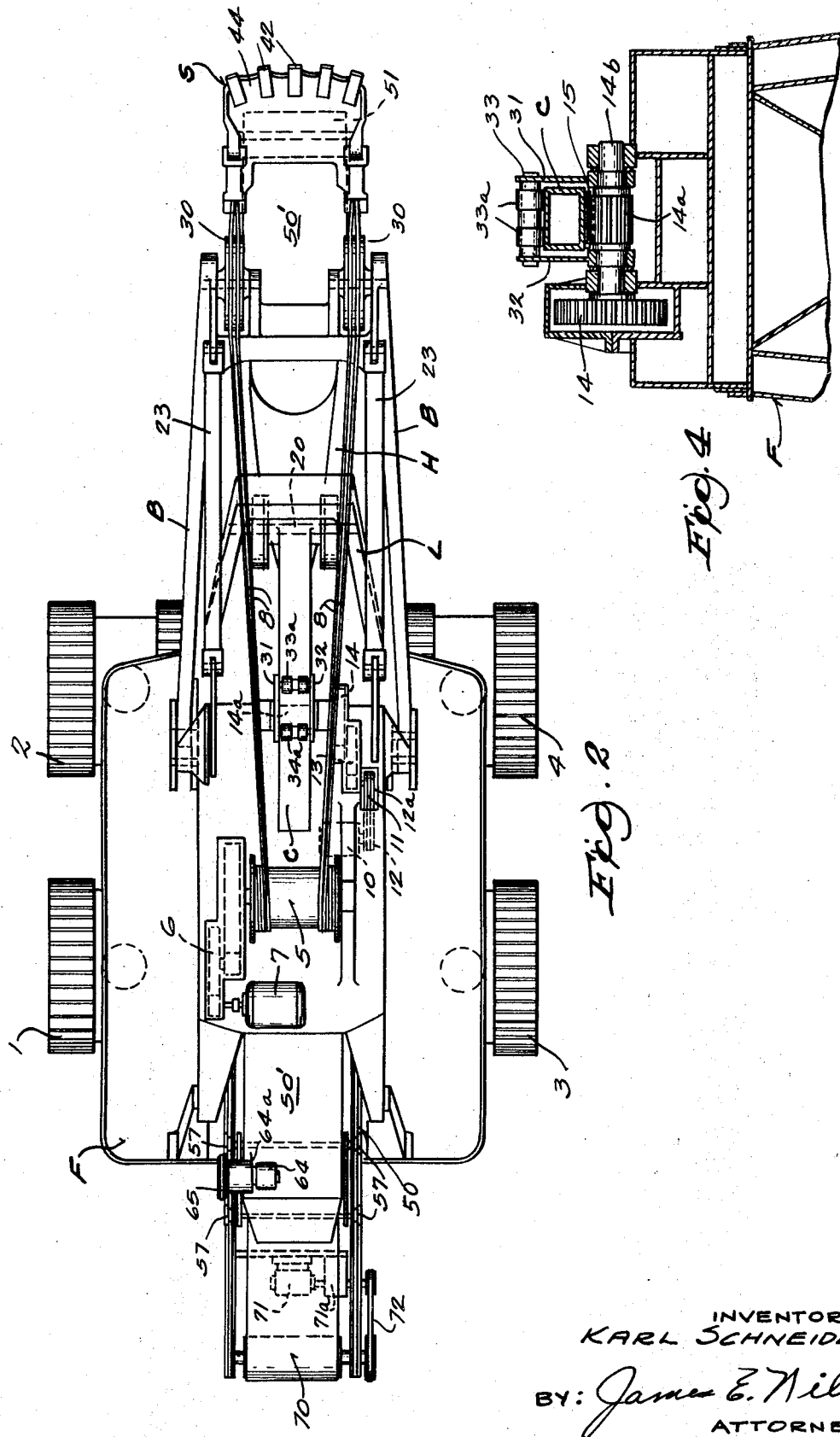

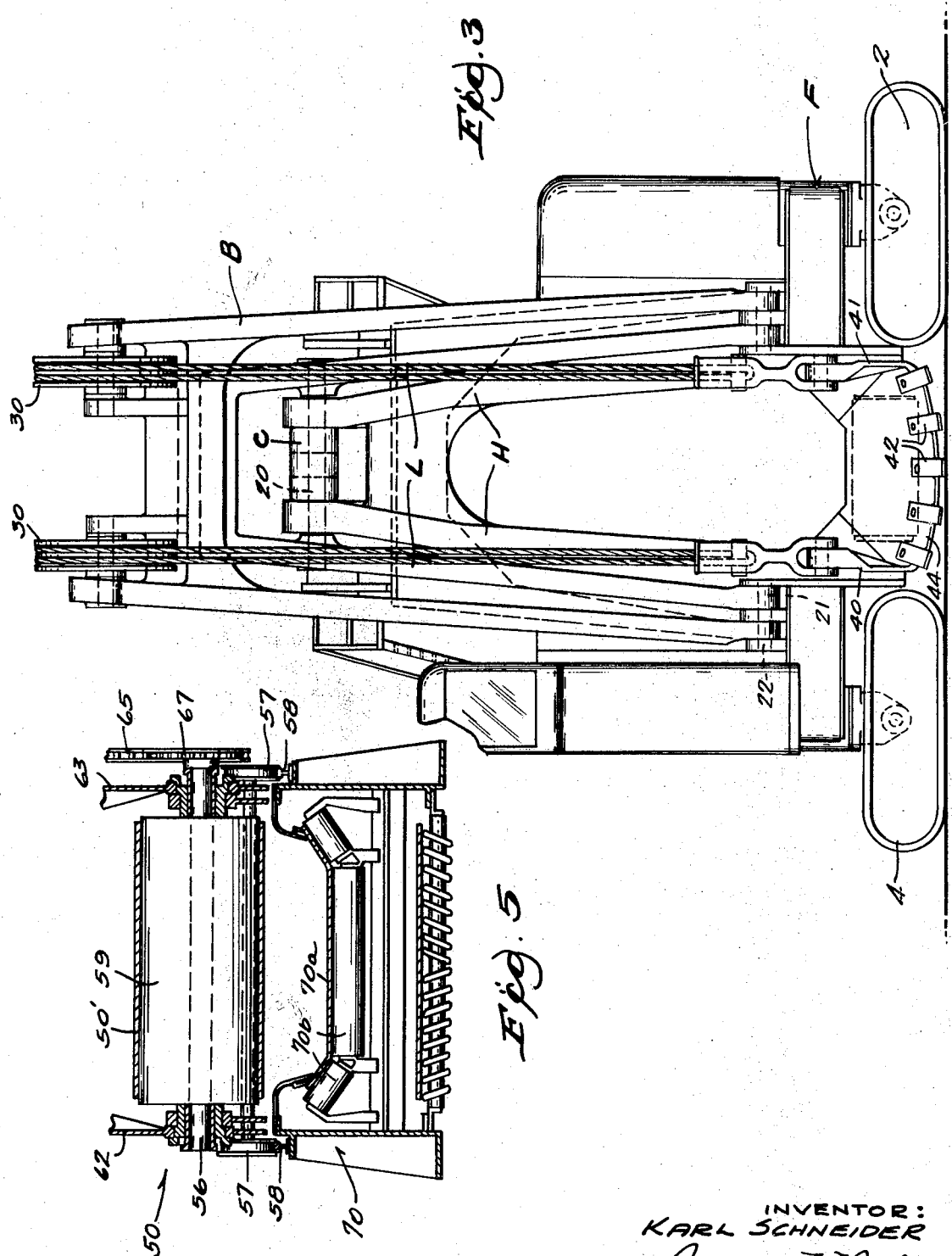

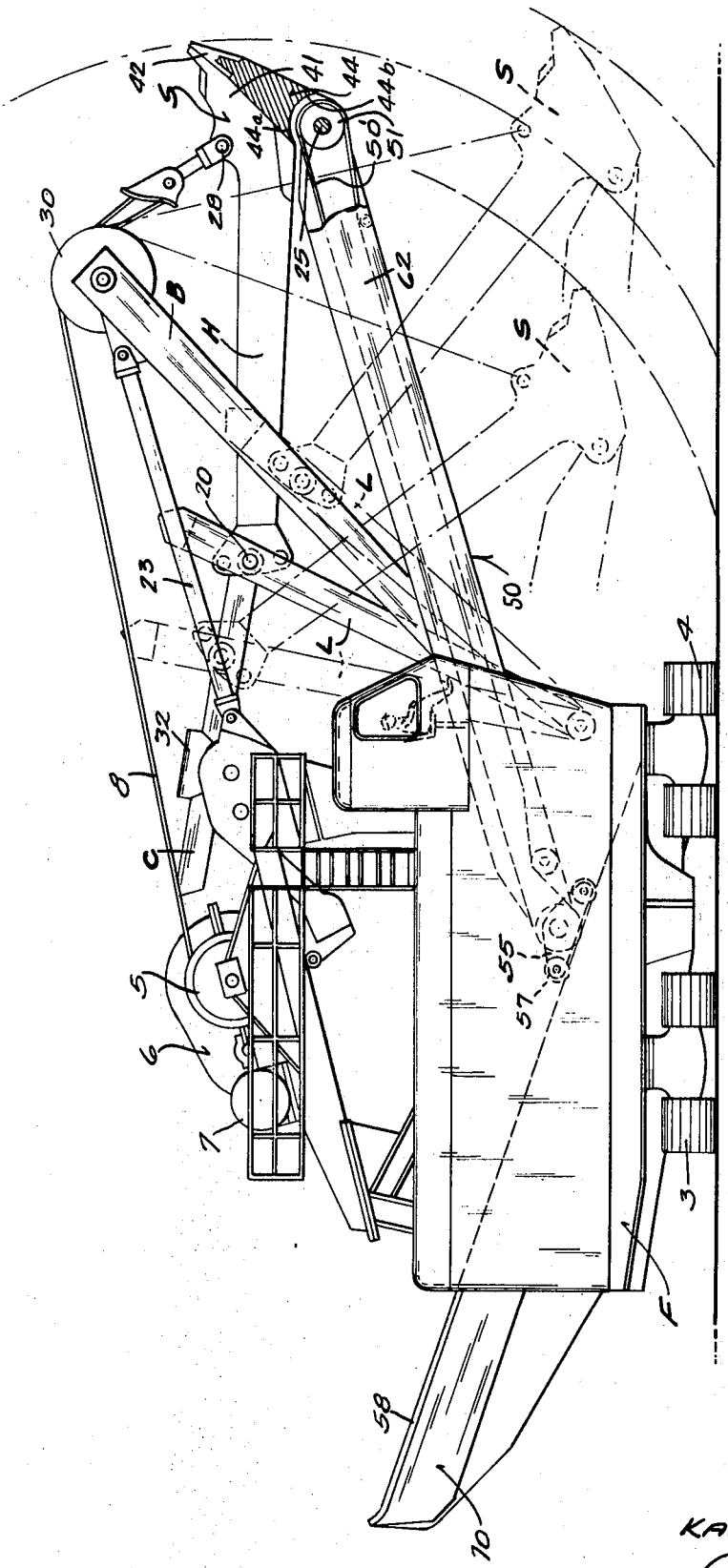

June 30, 1970  K. SCHNEIDER  3,517,840
CONVEYOR EXCAVATOR HAVING PLURAL CONVEYORS FOR
CONTINUOUS UNLOADING
Filed Jan. 2, 1968  5 Sheets-Sheet 5
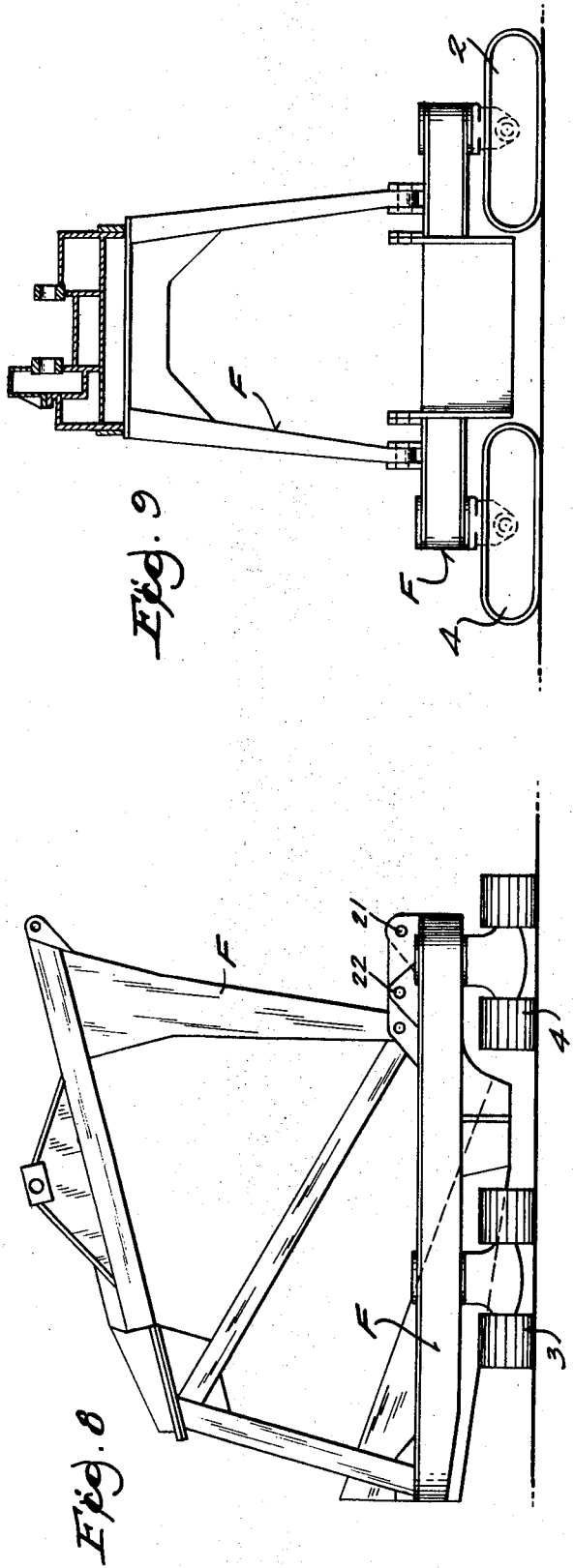
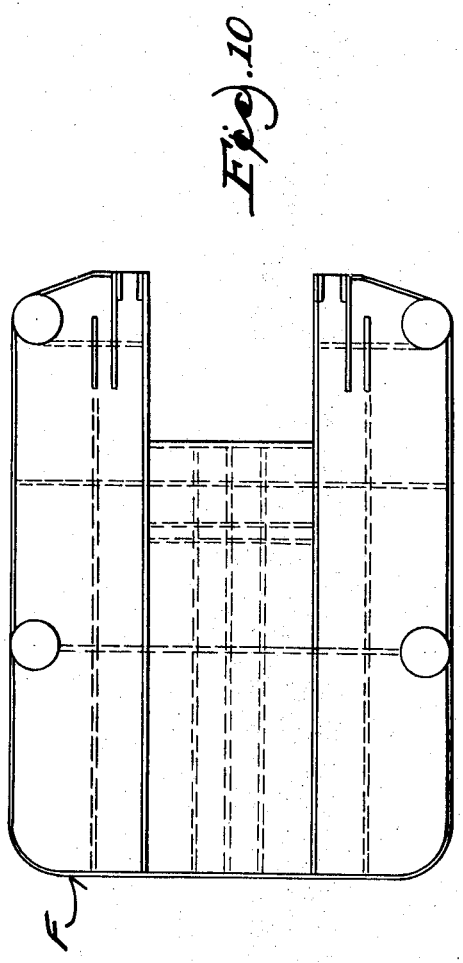
INVENTOR:
KARL SCHNEIDER
BY: James E. Nilles
ATTORNEY

United States Patent Office

3,517,840
Patented June 30, 1970

3,517,840
CONVEYOR EXCAVATOR HAVING PLURAL CONVEYORS FOR CONTINUOUS UNLOADING
Karl Schneider, Milwaukee, Wis., assignor to Harnischfeger Corporation, West Milwaukee, Wis., a corporation of Wisconsin
Filed Jan. 2, 1968, Ser. No. 695,095
Int. Cl. E02f *3/30, 3/74*
U.S. Cl. 214—91                                   7 Claims

ABSTRACT OF THE DISCLOSURE

An excavating machine having a digger which is vertically swingable on the end of a handle. A plurality of conveyors are provided, one of which has a rigid frame attached directly to the digger for receiving the material from the digger and conveying it onto the second conveyor. The second conveyor is of the fixed type and is located adjacent the lower part of the machine with its front end close to the ground so that the first conveyor which is connected to the digger is always at an efficient conveying angle for positively controlling the material being continuously and uniformly unloaded, regardless of the vertical position of the cutter.

Background of the invention

The invention pertains to conveyor excavators of the type having a vertically actuated shovel arm in combination with an endless power driven conveyor extending therefrom, so as to continuously and uniformly transfer the loosened material onto a second fixed conveyor.

Conveyor excavators of the type with which the present invention is concerned have generally been known in the prior art but have had serious shortcomings. For example, the device shown in the U.S. Pat. No. 766,888, which issued on Aug. 9, 1904, to J. H. Miller, utilized an endless conveyor for unloading the shovel, but the conveyor depended on gravity to move the material onto the conveyor. Consequently this device, as well as many other prior art devices, would not unload uniformly or continuously, and in fact would not unload at all if the conveyor were inclined to any appreciable extent in an upwardly and rearwardly direction. At the other extreme, when the conveyor was inclined downwardly towards its rear discharge end, the material would fall unpredictably as an avalanche, all resulting in very haphazard unloading and requiring erratic operation of the shovel. Other prior art devices utilized a conveyor which was inclined at such an angle, or combined with the shovel handle in such a manner, so as to prevent proper unloading, and would prevent any unloading whatsoever, when the shovel was in certain digging attitudes and elevations. Examples of these devices are shown in U.S. Pat. 3,206,048, issued Sept. 14, 1965, to Weiss et al., or U.S. Pat. 1,825,956, issued on Oct. 6, 1931, to Huennekens, the latter of which was assigned to an assignee common with the present invention. Still other prior art devices, such as the British Pat. 11,611 of 1909 to Whitaker, also had the conveyor formed as the shovel handle, while others used a simple chute for this purpose.

These prior art devices often required auxiliary parts for providing separate supports for the conveyors, or they required turntables, swing machinery or roller circles, center gudgeons, in order to provide the necessary maneuverability for the digging operation. Nevertheless, they were still incapable of a continuous, uniform and programmable digging or excavating operation.

Summary of the invention

The present invention provides a conveyor excavator having a power driven, endless conveyor extending rearwardly from the digging cutter at such an angle and in such a manner so as to be able to continuously and uniformly unload the cutter regardless of the attitude or elevation of the cutter onto a second fixed conveyor. The invention further insures that the excavator can impart exceptional digging forces which are transmitted in an efficient and effective manner through the lower part of the machine and directly back into the ground by virtue of the articulated lower crawler arrangement.

The present excavator has a crawler type drive by means of which any desired horizontal steering pattern of the excavator can be attained, so as to follow a predetermined and exact path of cut.

Another aspect of the invention relates to a solid handle and cutter construction where the cutting angle adjustment for the cutter teeth is made by use of multiple fulcrum points on the stick.

This conveyor excavator of the present invention, combines the exceptional digging ability of the conventional revolving shovel, the continuous digging cycle of the wheel type excavator, and the mobility of the front end loader type of excavator. With the present invention, the material is moved positively and immediately from the digging teeth of the cutter without permitting any bunch-up or accumulation, or excessive feeding of material, and it does not depend on gravity or a certain angle of inclination of the cutter handle for proper operation. The flow of material, instead, is controllable at all elevations of cut and the entire digging cycle can be programmed or computerized.

Means are also provided for propelling the end trolley of the conveyor upward.

Other features, such as hydraulic or pneumatic or mechanical means to assist the flow of material from the cutter to the conveyor, may be utilized in accordance with the present invention.

Brief description of the drawings

FIG. 1 is a side elevational view of an excavator embodying the present invention, with the operator's cab and cover of the machine removed for clarity;

FIG. 2 is a plan view of the machine shown in FIG. 1, but with the parts moved to a different position;

FIG. 3 is a front elevational view of the machine shown in FIG. 1, but with the cab and cover attached;

FIG. 4 is a sectional view taken generally along line 4—4 in FIG. 1, but on an enlarged scale, and certain parts such as the cables removed for clarity and with a portion of the cab broken away;

FIG. 5 is a sectional view taken along line 5—5 in FIG. 1, but on an enlarged scale;

FIG. 6 is a sectional view taken along line 6—6 in FIG. 1, but on an enlarged scale;

FIG. 7 is a view generally similar to FIG. 1, partially in section, but also showing the operator's cab and the cover for the machine, and furthermore showing different positions of the shovel;

FIG. 8 is a side elevational view of the main structure as shown in FIG. 1;

FIG. 9 is a front elevational view of the main structure as shown in FIG. 8;

FIG. 10 is a plan view of the lower main structure as shown in FIG. 2.

Description of the preferred embodiment

The shovel as shown in the present form includes four pairs of endless crawlers 1, 2, 3 and 4, two being located on each side of the machine and each being rotatable about its vertical axis, which axes are mounted in the main frame F of the machine. These crawlers are independently driven in either direction and support the main fixed frame F of the machine, so that it does not rotate or swing relative to the ground engaging crawlers. Other known crawler configurations may be employed.

Hoist and crowd mechanism

The upper part of the main frame carries the hoist machinery which includes the cable drum 5, driven through constant mesh gearing 6 from the electric motor 7. This hoist machinery, including cable 8 provides the digging action of cutter S thru the bank (not shown).

This part of the frame also carries the crowd machinery which includes electric motor 10, V belts 11 and their associated sheave 12 and gear 12a, the reduction compound gear 13, a gear 14a fixed on a central pinion 14, and gear rack 15. More specifically, rack 15 is fixed to the lower portion of the single crowd stick C, while the central pinion 14 is fixed on its shaft 14b that in turn is suitably journalled in the main structure, all shown on FIGS. 1, 2 and 4. The reversible electric motor 10 thus causes the crowd stick C to shift back and forth, carrying with it the wishbone shape front leg L and the wishbone shape handle H, to which it is pivotally and adjustably attached by the shaft 20, so that each pivot point will correspond to a definite cutting angle of the cutter teeth.

The front leg L is pivoted at its lower bifurcated end to the main frame by means of the stub shafts 21.

A fixed, wishbone shape boom B is secured at its lower, bifurcated end to the main frame F by means of stub shafts 22. A stiff suspension link 23 rigidly connects the upper end of the boom to the top of the main frame.

The lower end of the handle H has the cutter S solidly fixed thereto and as will later appear, this rigid connection provides high strength and rigidity by the elimination of variable backbraces, lugs and supporting ribs.

In the present machine, the upper end of the cutter handle has a plurality of holes 26 arcuately arranged in respect to a shaft 25, which connects the cutter to a conveyor to be described.

The digging angle of the cutter is adjusted at the upper end of the handle as follows. Shaft 20 can be inserted in either of the three sets of holes 26 in the handle to easily vary the attack angle of the cutter teeth. Each of these positions provides a definite cutting angle for the cutter.

Hoist cables 8 are secured at 28 to the hoisting ears of the cutter, two cables being used for each side of the shovel. Cables 8 are trained over the two sheaves 30 rotatably mounted on the upper end of boom B.

As previously mentioned, the rear end of the handle H is pivoted on shaft 20 which in turn also connects the front end of the crowd stick C and the upper end of the leg L.

The boom B, leg L and handle H are generally of a suitable structural shape.

The gear rack 15 of the crowd stick C is held in meshing engagement with the central pinion 14 by means of the pair of triangular shaped saddle blocks side plates 31 and 32, one located on each side of the stick. These blocks are connected together by shafts 14b, 33 and 34 (FIG. 1). Shafts 33 (FIG. 2) and 34 in turn support the pairs of rollers, respectively, 33a and 34a. Rollers 33a and 34a ride along the upper side of the crowd stick to thereby hold the stick captive against the pinion on shaft 14b, regardless of the axially shifting movement of the stick.

Thus the hoist mechanism can vary the elevational position of the cutter, and the crowd stick can shift the fulcrum of leg L and handle H fore and aft for the desired approach and cutting depth with regard to the general longitudinal axis of the machine.

Cutter

The cutter S has opposite side walls 40 and 41, an open back side, and cutter teeth 42 along its front, lower edge. These teeth are replaceably fixed to the cutter frame (FIGS. 1 and 3). The upper lip 44a of the cutter 44 extends rearwardly and slightly over the front end of the endless, power driven conveyor 50, to be described, thus protecting the latter and insuring immediate and positive delivery of the material to the conveyor 50. The lower lip 44b of the cutter frame 44 extends rearwardly and beneath the front end of the conveyor to form an unyielding protection for the conveyor 50 as the shovel moves through the material pile (not shown).

First conveyor

The conveyor 50 includes the front idler roll 51 which is located on shaft 25 (FIG. 6). In other words, shaft 25 serves as the support for the return idler roller 51 and as the pivot point for the cutter S and its rigid handle H.

In this manner, the conveyor 50 extends rearwardly from the rear side of the cutter and receives material directly from the cutter and immediately conveys it onto the fixed conveyor. It should be noted that the maximum inclined position of this conveyor when in the utmost upper and rearward position as shown in FIG. 7, will not induce free slip of the material on this conveyor belt.

The rear end of this first conveyor is carried by a four wheel trolley 55 with wheels 57 which ride on the track rail 58 which is supported on the side walls of the fixed conveyor 70. This fixed guide track 58 is inclined preferably at an angle of about 20 degrees. A rear roll 59 is fixed on shaft 56 and an endless conveyor belt 50 is trained around rolls 51 and 59 (FIGS. 1, 5 and 6) so that its upper flight travels in a rearward direction. Suitable idler rollers 61 rotatably mounted on the side walls 62 and 63 of the conveyor 50 support the belt 50' along its length.

The conveyor drive shaft 56 (FIG. 5) is driven by a variable speed, electric motor 64 coupled to a speed reducer 64a through a suitable chain 65 and sprockets 66 (FIGS. 1, 2 and 5) and 67 fixed, respectively, to the reducer shaft and the shaft 56. Thus the speed of the conveyor can be regulated.

Second conveyor

A second endless driven conveyor 70 is fixed on the main frame and its belt 70a, supported on rollers 70b, receives the material which is discharged from the rear end of conveyor 50. Conveyor 70 is driven by electric motor 71 coupled to a speed reducer 71a through a suitable endless chain 72 and appropriate sprockets. This second conveyor is located directly beneath the rear end of the conveyor 50, which rides along and just above this lower conveyor 70. Conveyor 70 is elevated sufficiently at its rear end so as to discharge material on to waiting railway cars, trucks, or the like (not shown).

General

Due to the independent variable and reversible drive for each crawler, the machine can pivot or steer about any infinite number of pivot points within the rigid frame of the crawler base. Thereby the machine can continuously dig in any forward direction and through any desired horizontal steer and propel pattern of the machine.

The present conveyor excavator combines the unexceeded digging ability of the revolving shovel, the continuous digging cycle of the wheel excavator and the mobility of the front end loader.

I claim:

1. A conveyor excavator comprising power driven ground engaging support means, a fixed main frame carried by said support means, an upwardly extending boom fixed on said main frame and having hoisting sheave means adjacent its upper end, a leg pivotally attached at its lower end to said main frame and extending upwardly therefrom and terminating in a swingable upper end, a cutter handle pivoted at its upper end to said leg upper end, an earth engaging cutter at the lower end of said handle, a series of pivot point connections between said upper end of said handle and said leg for selectively adjusting the angle of attack of said cutter, power hoist means carried on said main frame and including cable means trained over said sheave means and secured to said cutter for vertically positioning the latter, power driven crowd mechanism connected between said main frame and said handle for crowding the handle and cutter in a fore and aft direction; and a fore and aft arranged, first power driven material conveyor, said first conveyor having a rigid frame and pivotally connected at its forward end to said cutter for receiving material directly therefrom, said series of pivot point connections being located as an arc about the point of pivotal connection between said first conveyor and said cutter, said first conveyor also having an endless belt, and a power driven trolley attached to the rear end of said first conveyor, said trolley having power means for positively driving said endless belt in its endless path, a second conveyor mounted on the lower portion of said main frame and supported entirely thereby for receiving material from the rear end of said first conveyor, said second conveyor having a front end located in close proximity to the ground level to allow the cutter to work closely adjacent the ground in its rearward position, said trolley shiftably supporting said first conveyor for fore and aft movement over said second conveyor.

2. The excavator as set forth in claim 1 further characterized in that said handle is pivotally and adjustably attached to the upper end of said leg and has means at its upper end for adjusting its position relative to the leg, whereby the cutter angle of attack can be varied about the pivot connection between the first conveyor and said cutter.

3. The excavator described in claim 1 further characterized in that said crowd mechanism includes a power driven pinion on said frame, a shiftable crowd stick having a gear rack meshing with said pinion, said stick being pivotally connected to said handle, and means for maintaining said rack in mesh with said pinion.

4. The excavator of claim 1 further characterized in that said cutter has a cutter frame to which cutting teeth are attached, and said cutter frame has rearwardly extending upper and lower lips adjacent to and partially around the front end of said first conveyor for shielding said front end.

5. The excavator as set out in claim 1 including a fixed guide track mounted on the frame of said second conveyor for the rear end of said first conveyor and carried entirely by the frame of said second conveyor, said track being inclined about twenty degrees.

6. The excavator defined in claim 1 wherein the second conveyor extends in a fore and aft direction and has a rear end elevated for discharge into a separate vehicle.

7. A conveyor excavator comprising, power driven ground engaging support means, a fixed frame carried by said support means, an upwardly extending boom fixed on said frame and having hoisting sheave means adjacent its upper end, a swingable cutter handle having an upper end and a lower end, an earth engaging cutter rigidly fixed on the lower end of said handle, a power hoist means carried on said frame and including cable means trained over said sheave means and secured to said cutter for vertically positioning the latter, power driven crowd mechanism connected between said frame and said handle for crowding the handle and cutter in a fore and aft direction, said crowd mechanism including a crowd stick having a forward end; a series of pivot point connections between said forward end of said crowd stick and the upper end of the cutter handle and whereby the cutting angle of the cutter can be varied; and a fore and aft arranged, power driven, material conveyor pivotally connected at its forward end to said cutter for receiving material directly therefrom, said series of pivot point connections being located generally as an arc with the center at the pivotal connection between said conveyor and cutter; the rear end of said conveyor having means for shiftably supporting said conveyor for fore and aft movement.

References Cited

UNITED STATES PATENTS

| | | | |
|---|---|---|---|
| 766,888 | 8/1904 | Miller | 214—90 |
| 797,442 | 12/1910 | Crismon | 37—102 |
| 1,825,956 | 10/1931 | Huennekens | 214—90 |
| 2,384,242 | 9/1945 | Fitch | 214—90 |
| 2,439,912 | 4/1948 | Stoltz | 214—90 |
| 2,479,823 | 8/1949 | Ernst | 198—89 |
| 2,600,739 | 6/1952 | Dempster | 214—136 XR |
| 2,771,958 | 11/1956 | Ball | 180—6.48 |
| 3,206,048 | 9/1965 | Weiss et al. | 214—90 |
| 3,258,143 | 6/1966 | Steinmann | 214—135 |

FOREIGN PATENTS

| | | |
|---|---|---|
| 626,773 | 3/1936 | Germany. |

ROBERT E. PULFREY, Primary Examiner

C. D. CROWDER, Assistant Examiner

U.S. Cl. X.R.

37—118; 198—89, 96; 214—136